Oct. 2, 1962 N. DAVIS 3,056,599
WINDOW OPERATING APPARATUS
Filed May 21, 1957 7 Sheets-Sheet 1

INVENTOR.
NOEL DAVIS
BY RICHEY, WATTS, EDGERTON,
McNENNY & FARRINGTON.
ATTORNEYS

Oct. 2, 1962

N. DAVIS 3,056,599

WINDOW OPERATING APPARATUS

Filed May 21, 1957

INVENTOR.
NOEL DAVIS

BY
RICHEY, WATTS, EDGERTON,
McNENNY & FARRINGTON.
ATTORNEYS

INVENTOR.
NOEL DAVIS
BY RICHEY, WATTS, EDGERTON,
McNENNY & FARRINGTON.
ATTORNEYS

Oct. 2, 1962 N. DAVIS 3,056,599
WINDOW OPERATING APPARATUS
Filed May 21, 1957 7 Sheets-Sheet 6

INVENTOR.
NOEL DAVIS
BY RICHEY, WATTS, EDGERTON,
McNENNY & FARRINGTON.
ATTORNEYS

United States Patent Office 3,056,599
Patented Oct. 2, 1962

3,056,599
WINDOW OPERATING APPARATUS
Noel Davis, Chagrin Falls, Ohio, assignor to Integrated Development and Manufacturing Company
Filed May 21, 1957, Ser. No. 660,631
3 Claims. (Cl. 268—21)

This invention relates generally to the greenhouse art and is more particularly concerned with a novel system for operating greenhouse vents and with novel apparatus and components of this system.

From the time that the first greenhouse was conceived and built until about 20 years ago all adjustments and operations of greenhouse vents were performed manually. However, as the necessity for constant close control over atmospheric conditions in greenhouses became apparent and the cost of labor made impracticable such control by manual means, a general demand developed for a means or method for operating these vents automatically. The thermostatic control and automatic operation of heating facilities including the boilers, steam lines, and valves previously developed and put into use did not eliminate or off-set the need for these additional controls and may in fact have actually increased the desire on the part of the greenhouse owners for adequate vent-operating facilities.

In response to this demand efforts were made by those skilled in the art over a period of some years with the net result, prior to the present invention, that power means were made available and installed in greenhouses to operate the vents automatically. These means, however, were deficient in their automatic operation to the point where in their ordinary course of use their motors were manually controlled at most times. Actually, in some instances the devices and systems of the prior art have been taken out of use after a brief but determined effort on the part of the greenhouse owner to make them function automatically to produce the desired results.

It is accordingly one of my primary objectives in making the present invention to provide a system which would satisfactorily operate greenhouse vents in a completely automatic manner.

Another important object of this invention is to provide a satisfactory automatic control system which is relatively inexpensive to manufacture and which also requires a minimum of maintenance and repair on ordinary service.

Still another object of this invention is to provide a system of this type which is adaptable to any existing greenhouse and thus may be installed with ease in old as well as new greenhouses and may be incorporated with a minimum of difficulty in manual vent operating systems or may be substituted for prior art vent-operating devices or systems.

All the foregoing objectives have been achieved, as will become clear from the present disclosure, and additional substantial advantages are to be obtained in accordance with this invention.

The double drive feature of the vent operators of this invention also has special advantages and utility and constitutes an important portion of the vent-operating system of this invention. By virtue of this novel device, two separate sets of greenhouse vents can be operated by one operator unit of this system through the addition of one sprocket to motor drive shaft and a chain connecting that sprocket to a sprocket carried by the operating shaft for the second set of vents.

Other novel elements, components, apparatus, features and advantages of the unique system of this invention will become apparent to those skilled in the art from the following description of installations embodying this invention, reference being had to the drawings accompanying and forming a part of this specification, in which:

In a greenhouse vent-operating system embodying this invention such as the system illustrated in these drawings, automatic and optional manual controls are combined and a number of different functions are incorporated into one installation or unit. As indicated above and in these drawings, and particularly FIG. 13, means are provided for automatic response of the system to fluctuations in temperature, humidity, light intensity, and wind and rain, and in addition control of heat in an automatic manner is possible. Furthermore, the system affords selectivity in respect to the closed position of the vents and the sequence of operation of the vents during both opening and closing stages.

In order to provide this unique system and its many functions a number of novel basic elements or components and new combinations of components and apparatus are necessary. In other words, this new system owes its existence to a number of new concepts and inventions and the integration of various units, components and subcombinations of apparatus in a new manner to produce hitherto unattainable and highly advantageous results.

One of these novel components is the limit switch assembly which those skilled in the art will understand holds the possibility of general use and is not limited to the system of this invention. This limit switch assembly, briefly described, comprises a first limit switch, a second limit switch spaced from the first one and opposed thereto to define a travel course of predetermined length for a switch actuator, a third limit switch having a contact member disposed between and movable relative to the first and second switches, and an actuator having a portion operatively engageable with the first and second switches and with the contact member of the third switch.

Still another novel apparatus of this system of my invention comprises the combination of control means operatively associated with a first means for opening and closing a first set of vents and a second means for opening and closing a second set of vents, this control means being operative to open the first set of vents before the second set of vents is opened and to close the second set before the first set is closed.

The novel double drive apparatus mentioned above in general comprises the combination of drive means for two separate greenhouse vent line shafts including a motor having a power output shaft, two sprockets carried by this power output shaft, a sprocket carried independently by each line shaft and two chains operatively associated independently with each line shaft sprocket and power output sprocket so that the two line shafts are driven simultaneously by the motor and the two sets of vents are simultaneously operated.

Figure 1:
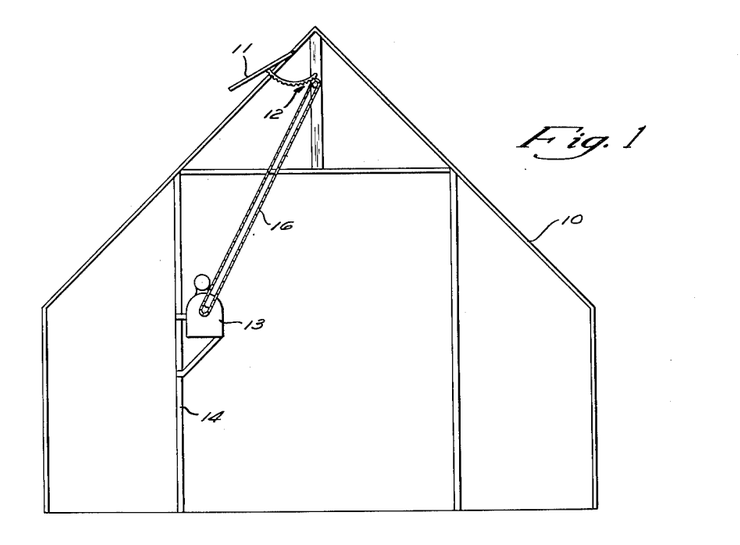
FIG. 1 is a schematic view showing a greenhouse equipped with vent operating means of the present invention.
Figure 4:
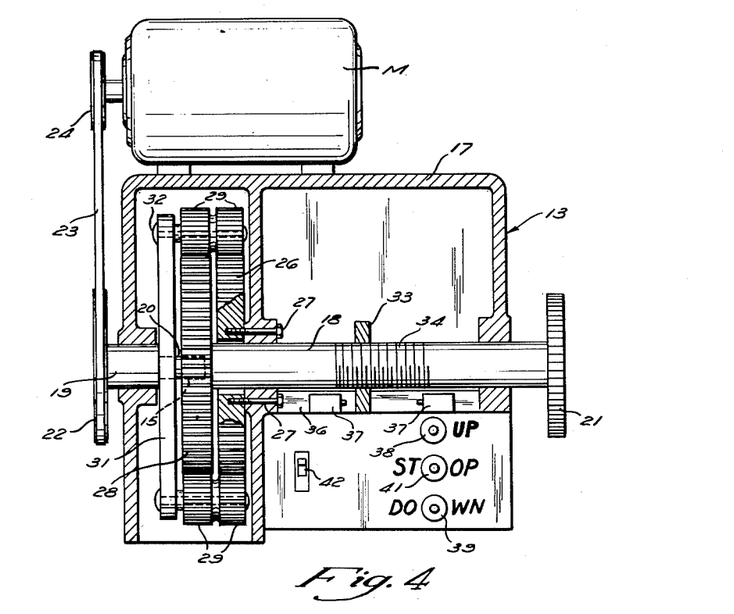
FIG. 4 is a side-elevational view of the vent operator of FIG. 1, parts being removed to reveal details of construction and particularly the planetary gear assembly and rotational limiting means.
Figure 5:
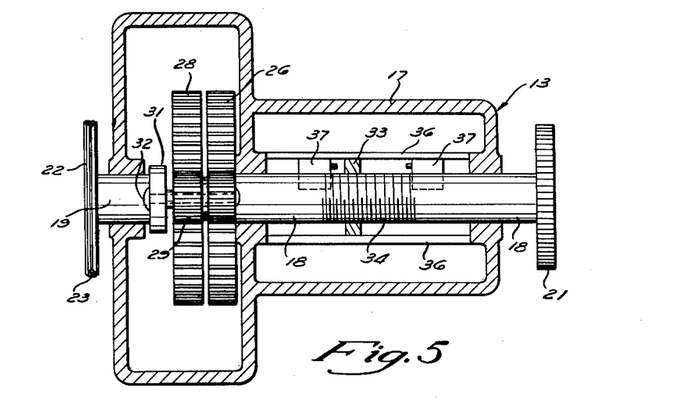
FIG. 5 is a horizontal sectional view of the operator of FIG. 4.

Additional novel apparatus embodied in this system comprises, broadly speaking, a power source, a control system for the power source, and a speed-reducing means which operatively connects the said source and vent operating means. The speed-reducing means includes a stationary sun gear, a planet gear engaging the sun gear and movable circumferentially around it and a driven gear which is mounted co-axially with the sun gear and engaged with the planet gear. The sun gear in this assembly has a different number of teeth than the driven gear and the control system includes stop means operatively connected to the speed reducing means to limit the extent of rotation of the latter. This apparatus is illustrated in FIGS. 4 and 5 and a typical installation of this apparatus is shown in FIG. 1, in which building 10 is a conventional greenhouse having vents 11 disposed near its peak, these vents operated by the rack and gear assembly indicated at 12. Vent actuating mechanism 13 of this invention is conveniently mounted on a support column 14 in the greenhouse and is operatively connected to the rack and gear assembly 12 by means of a chain drive 16.

For details of the structure of the actuating mechanism 13, reference should be made to FIGS. 4 and 5. A housing 17 is provided on which the power source, which is preferably an electric motor M, is mounted. The housing is provided with a through-bore which extends through the three downward extending walls and shafts 18 and 19 are coaxially journalled therein. The shaft 18 is bored as at 15 to provide journal for the integral projection 20 formed on the shaft 19. By providing this end journal for the shaft 19, a stronger and more rigid structure results. The shaft 18 is provided with a sprocket 21 at its outer extremity which engages the chain 16 shown in FIG. 1. The shaft 19 is provided with a pulley 22 which may be of the V-belt variety, and this pulley is connected to the motor M by means of the V-belt 23, and the pulley 24 mounted on the motor M.

A reducing gear assembly is mounted within the housing 17 and comprises a stationary sun gear 26 which is bolted to the housing 17 by means of the bolts 27. The axis of the sun gear 26 is arranged so that it is coaxial with the shafts 18 and 19. A driven gear 28 is mounted on the shaft 18 for rotation therewith, and is formed with a number of gear teeth different from the number of gear teeth on the sun gear 26. A plurality of planet gears 29 are mounted for rotation about the sun gear 26 and the driven gear 28. To provide for the driving of the planet gear 29 around the sun gear 26 and driven gear 28 a planet gear arm 31 is mounted on the shaft 19 and the planet gears are journalled on the outer extremity thereof, as at 32. The planet gears are arranged to engage both the sun gear and the driven gear, thereby providing a driving connection therebetween.

It is apparent to those skilled in the art that since the sun gear 26 and the driven gear 28 are formed with a different number of gear teeth, and since the planet gears 29 engage both of these gears, that by driving the planet gears 29 around the periphery of these two gears, the driven gear and in turn the shaft 18 is rotated according to the differential between the number of gear teeth in the sun gear and the driven gear. This structure provides for a very efficient gear reduction wherein large speed ratios are achieved with a minimum number of gears and surface wearing.

In order to provide for the control of the motor M, a control means is provided which can be mounted on the housing 17. This control means includes a stop actuating member 33 which is threaded to the shaft 18 by means of the threads 34. Guide rails 36 are provided to prevent the member 33 from rotating with the shaft 18 so that when the shaft 18 rotates the member 33 moves axially relative to the shaft in a direction depending upon the direction of rotating of the shaft. Limit switches 37 are also mounted within the housing 17 preferably on the guide rails 36 and are adapted to engage the member 33 as it moves axially along the shaft 18. These limit switches 37 are connected in the electrical circuit of the electric motor M and stop the motor when the ventilating windows are in their maxium closed or opened position. In the preferred embodiment three control switches are provided to initiate and control the operation of the electric motor M. The switch 38 is arranged to operate the motor in a direction which will raise the ventilating windows 11 and another switch 39 is arranged to actuate the electric motor M in a direction which will lower the windows 11. A stop switch 41 is also provided to stop the motor at any time so that the windows may be opened or closed any desired amount.

The buttons 38, 39, and 41 are preferably simply electrical push switches which are connected to the electric motor M in such a manner as to give the desired motor control. An overload device 42 may also be provided to eliminate the possibility of overloading the motor M and in turn the entire structure.

It is apparent that by using conventional wiring means it is possible to provide a plurality of control stations similar to the one mounted on the housing 17 which may be located remote from the apparatus in convenient locations. In a preferred embodiment, the limit switches 37 are mounted in a manner so that they may be adjusted axially relative to the shaft 18 and the member 33. This provides for adjusting the apparatus to the particular application so that the limit switches operate when the ventilating windows 11 are in their closed or opened position.

Figure 2:
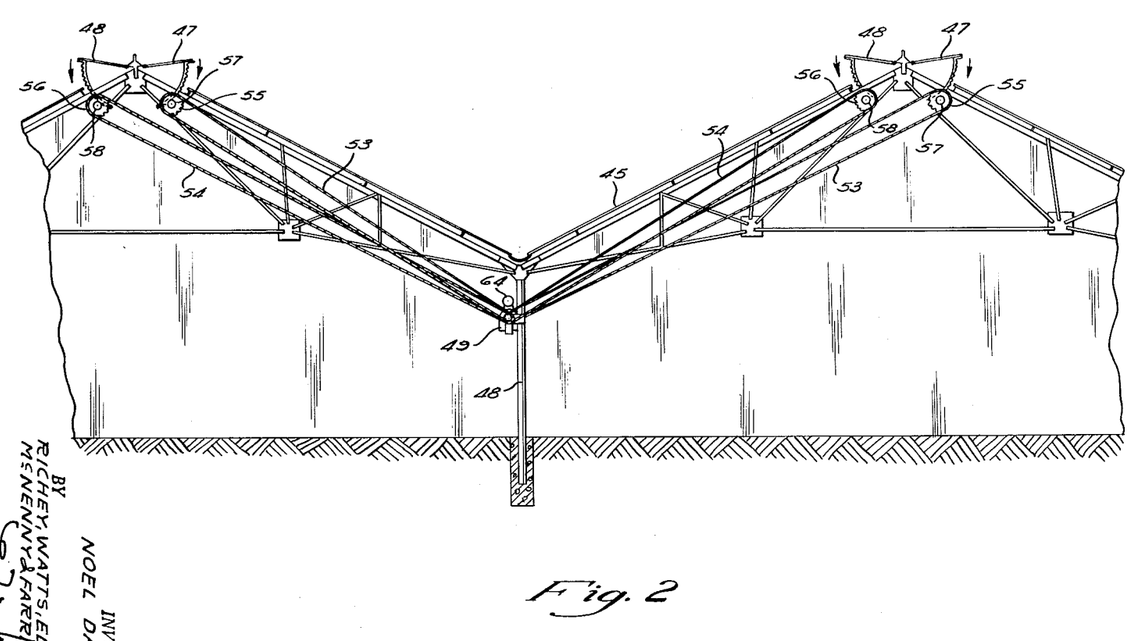
FIG. 2 is a fragmentary, transverse sectional view of another greenhouse equipped in an alternative and preferred manner with vent operators of the present invention system.

Referring to FIG. 2 another conventional greenhouse building 45 is shown as comprising a number of parallel, longitudinally-extending gables and sets of vents 47 and 48 on each side of each gable adjacent to the respective peaks, and a plurality of operators 49 of this invention for opening and closing these vents. This view illustrates a preferred type of installation wherein two sets of vents are driven by a single operator 49 and these vents are on the same side of adjacent gables to facilitate vent-operating sequence control subsequently to be described.

Figure 3:
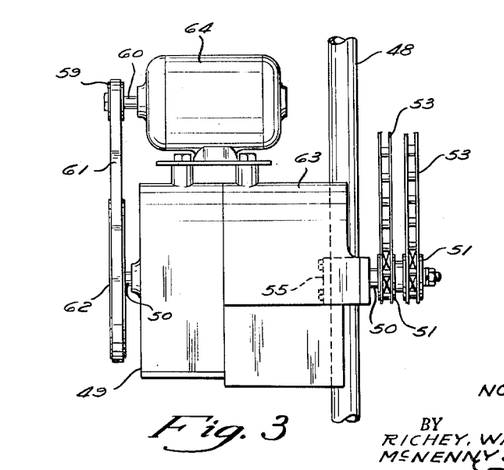
FIG. 3 is a side-elevational view of the vent operator illustrated in FIG. 2.

Operator 49, as illustrated in FIG. 3, has a power output shaft 50 fitted with two sprockets 51 which are connected by drive chains 53 to sprockets 55 keyed on vent-operating shafts 57. Operator 49 is multiplied according to the number of vents to be controlled and operated by the system of this invention so that as shown in FIG. 2 a minimum of two of these devices are required for a greenhouse of the standard twin-gable type, a second operator being located out of view behind operator 49. This second operator 49, has a power output shaft, like shaft 50 of FIG. 3, fitted with sprockets like sprockets 51 of FIG. 3 and these sprockets are connected by drive chains 54 to sprockets 56 keyed on vent operating shaft 58. Thus, the first operator 49 actuates the vents 47 while the second operator 49 actuates the vents 48.

Clamp means 55 serves to secure operator 49 to a supporting column 48 of building 45, preferably at a location which is easily accessible for repair and maintenance and yet is out of the way in the normal use and operation of the greenhouse. As in the case of the device of FIGS. 4 and 5, operator 49 has a metal housing 63 upon which electric motor 64 is mounted. The details of the drive of operator 49 which are hidden by housing 63 in FIG. 3 are suitably generally the same as those described above in reference to FIGS. 4 and 5 with the exception that the limit switch assembly illustrated in FIGS. 6 to 9, inclusive, is provided in place of the limit switch arrangement and assembly of the operator of FIGS. 4 and 5. Thus the same planetary gear assembly will be incorporated in operator 49 and will be driven by motor 64 operating through pulley 59 keyed to motor drive shaft 60, V-belt 61 and pulley 62 carried by shaft 50.

Figure 6:
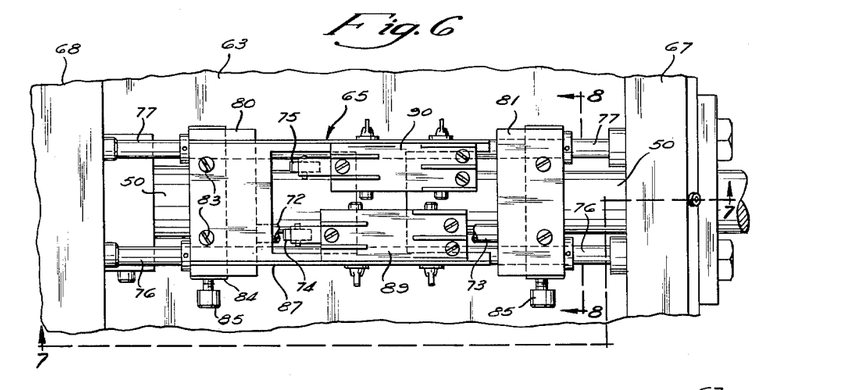
FIG. 6 is a plan view of a novel limit switch of this invention shown in assembly with a vent operator which is fragmentarily illustrated.
Figure 7:
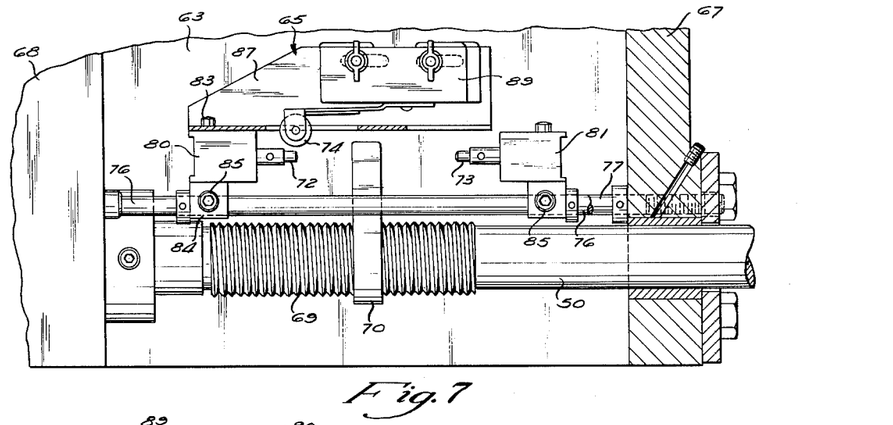
FIG. 7 is a sectional view taken on line 7—7 of FIG. 6.
Figure 8:
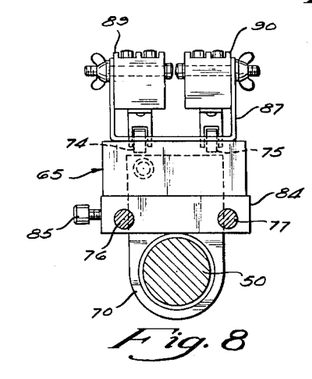
FIG. 8 is a transverse sectional view taken on line 8—8 of FIG. 6.

Limit switch assembly 65 is mounted adjacent to and above shaft 50 in housing 63, being disposed between inner wall 67 of housing 63 and outer wall 68 thereof. Shaft 50 is provided with a threaded section 69 between walls 67 and 68 and limit switch actuator 70 is carried as nut on section 69 for travel in a reciprocating manner over a length of a travel course defined by the upper and lower limit contacts 72 and 73, respectively, of assembly 65. Actuator 70 has an upwardly projecting portion or tongue which is engageable with an intermediate limit switch contact pieces 74 and 75 and with switch mount members 76 and 77 which are spaced apart and parallel and which extend between walls 67 and 68 of the housing and are firmly fixed in place with respect thereto.

Lower limit switch 80 and upper limit switch 81 are of essentially the same form and construction and thus a description of one will serve for both. Switch 80 may conveniently be of a standard type available on the market. The housing of this switch is fitted with mounting screws 83 by means of which the switch housing can be securely fastened to a base 84 built to straddle the mounting bars 76 and 77 and fitted with a locating screw 85 to hold the base in predetermined position with respect to these mounting members. Thus both switches 80 and 81 are slideably mounted with respect to shaft 50 and yet can be securely positioned relative to the shaft to assure proper operation of the system of this invention and proper positioning at both open and closed positions of the vents of a greenhouse equipped with this system.

A mounting bracket 87 of generally U-shape in cross section is secured to the top of the body of switch 80 by means of screws 83 for the purpose of supporting intermediate limit switches 89 and 90 in predetermined position with respect to shaft 50. Slots are provided in the upper side portions of bracket 87 to permit sliding adjustment of the intermediate limit switches in respect to each other and to bracket 87 and shaft 50 to produce the desired results in the operation of greenhouse vents controlled by this assembly. Wing nut means are provided for the purpose of securing the intermediate limit switches adjustably and removably in position. Switches 89 and 90 may be standard-type micro switches which are available on the market. The switches have spring-mounted roller contact pieces while switches 80 and 81 have plunger-type contacts, but it will be understood that these devices are electrically interchangeable in accordance with this invention so long as actuator 70 can traverse its full course without interference by an inactive intermediate switch member.

Figure 9:
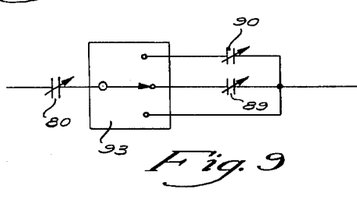
FIG. 9 is a wiring diagram illustrating the electrical circuits of the FIG. 6 device which is within block 118 of FIG. 17.

The wiring diagram of FIG. 9 shows schematically the functional relationship in this system between the several limit switch elements of assembly 65 and a selector switch. In this diagram, 80 represents the lower limit switch while 89 and 90 represent the intermediate limit switches as in the foregoing views. The selector switch in this system is indicated at 93 and its physical embodiment is illustrated to best advantage in FIG. 15.

Figure 10:
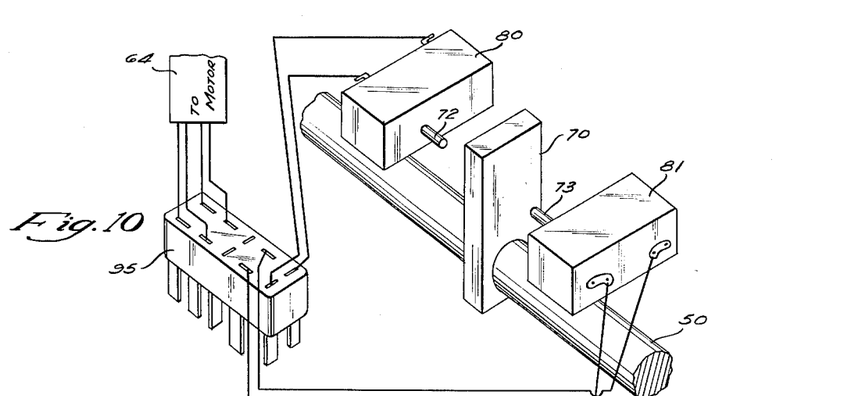
FIG. 10 is a diagrammatic view illustrating a typical installation including a motor and basic components of the limit switch of FIG. 6.

FIG. 10 illustrates the wiring diagram for the motor and upper and lower limit switches and a male connector in a typical circuit of a system of this invention. Thus 50 designates the shaft of FIGS. 6, 7, and 8 and the limit switches are shown at 80 and 81 with their contacts at 72 and 73 for engagement by actuator 70 as it travels back and forth along shaft 50.

Motor 64 is connected electrically to male connector 95 and as indicated in this diagram switches 80 and 81 are independently connected to the male connector.

Figure 11:
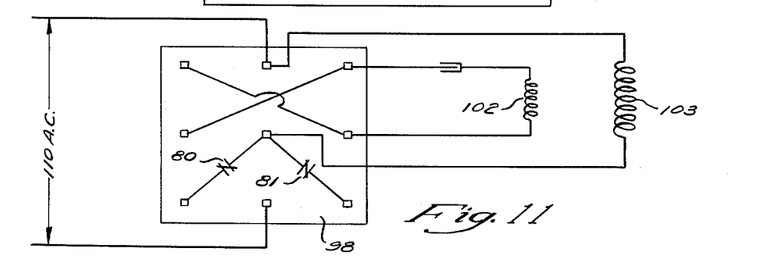
FIG. 11 is an electrical schematic drawing of the combination of FIGS. 10 and 12.
Figure 12:
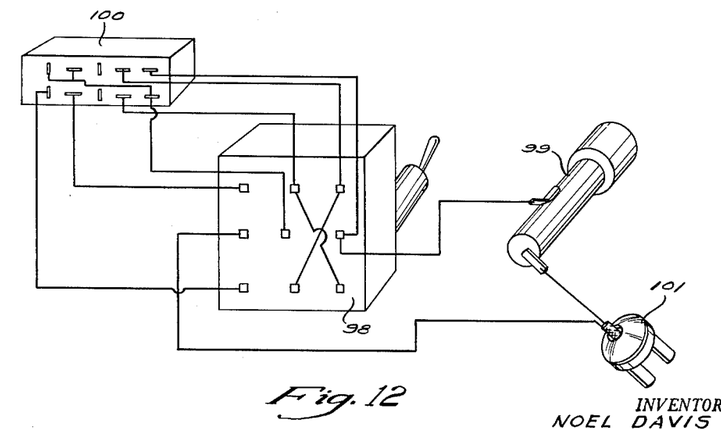
FIG. 12 is a diagrammatic view of a basic toggle circuit making up the other complementary parts for those in FIG. 10.

FIG. 12 accordingly illustrates the arrangement and wiring of the fundamental parts of the control system of this invention, while FIG. 11 illustrates the wiring of this motor control system. FIG. 12, then, illustrates the most basic arrangement of the complementary parts to complete the control system of FIG. 11.

The components of FIG. 12 are toggle switch 98, power fuse 99, female connector 100 and male plug 101. The start coil 102 and run coil 103 of motor 64 are connected through this switch to the power source.

Figure 13:
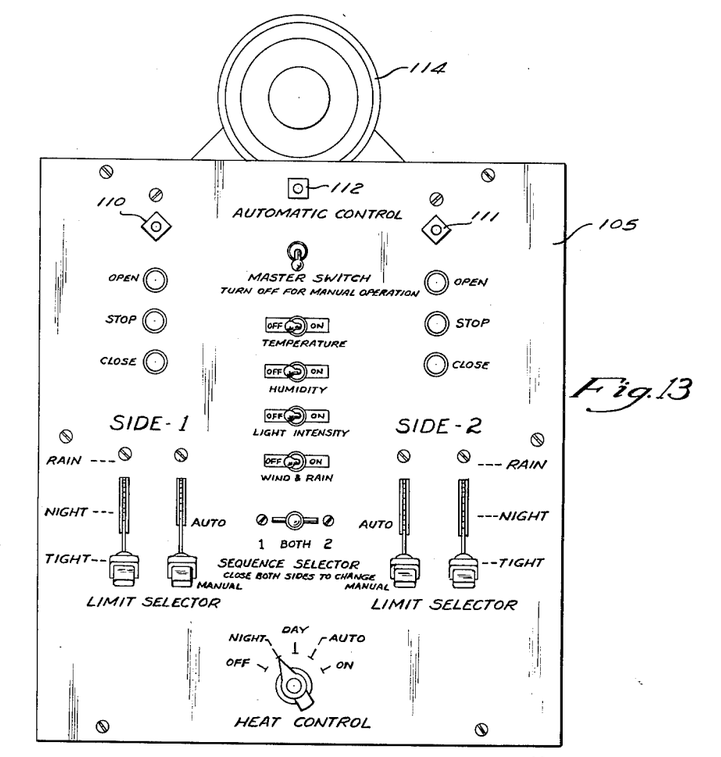
FIG. 13 is a front view of a typical automatic control panel of this system.
Figure 14:
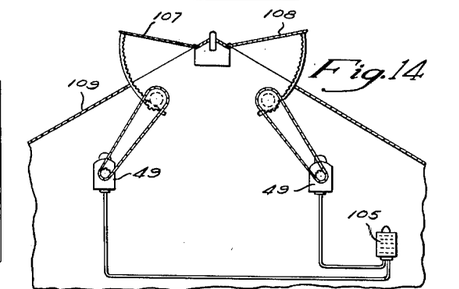
FIG. 14 is a schematic view illustrating a system incorporating the master control panel shown in FIG. 13.

Control panel 105 shown in FIG. 13 is designed for use, as indicated in FIG. 14, in operating either automatically or manually two separate sets of vents on opposite sides of a greenhouse. In this instance a set of operators 49 are separately connected into board 105 and are separately connected to vents 107 and 108 adjacent to the peak of greenhouse building 109, as described in reference to the embodiment of this invention illustrated in FIG. 2.

Board 105 is conveniently mounted at a place remote from operators 49 and in the usual installation will serve to afford control over a plurality of operators 49 arranged in two sets along two sides of a greenhouse.

As the legends indicated, the operator has the choice of manual or automatic operation of the vent operating system through board 105 and has also only to throw several switches to make the system responsive to all the various atmospheric conditions important in greenhouse operation. In normal operation on an automatic basis the system will be set up on board 105 in such a way that the vents will be opened or closed with variations in temperature, humidity, light intensity, and wind and rain, and the sequence of operation of the vents along the two sides will be fixed in accordance with the operator's desire through the positioning of a toggle switch in the lower central portion of the board. Also, the closed position of the vents will be selected through the adjustment of the limit selector, thus insuring that the vents are either fully or tightly closed or left ajar as usual at night or more open as usual under rain conditions. Board 105 also provides a switch for selection of heat control according to night or day conditions and for shutting off the heat or turning it on. The automatic position provides for automatic change over from night to day and vice versa.

Pilot lights 110 and 111 indicate the operating conditions in the circuits for side 1 and side 2, respectively, and pilot light 112 is illuminated when the circuits serving both sides of the control panel are on automatic control.

Timer 114 mounted on top of board 105 serves, as indicated above, to eliminate any hunting tendency of the system of this invention under conditions of automatic operation. This timer may suitably be one of those commercially available on the market.

Figure 15:
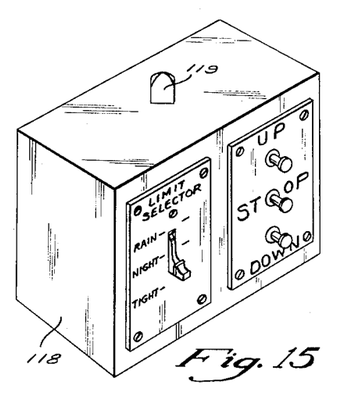
FIG. 15 is a perspective view of a master remote station of said system.

Referring to FIG. 15, remote station and limit selector assembly 118 is illustrated as being contained in a metal shell. A pilot light 119 is located on top of the shell to indicate when the bulb is illuminated that the circuit through the motors of the operators controlled from this station is closed and that the vents are being moved to new positions. This remote station and limit selector unit can be used to control a plurality of operators 49 in an automatic manner, but it does not afford all the functions available in the control panel 105. The value of this unit 118 is primarily in its ability to be installed or incorporated in an existing system in addition to or in place of unit controls at each operator 49 in a series.

Figure 16:
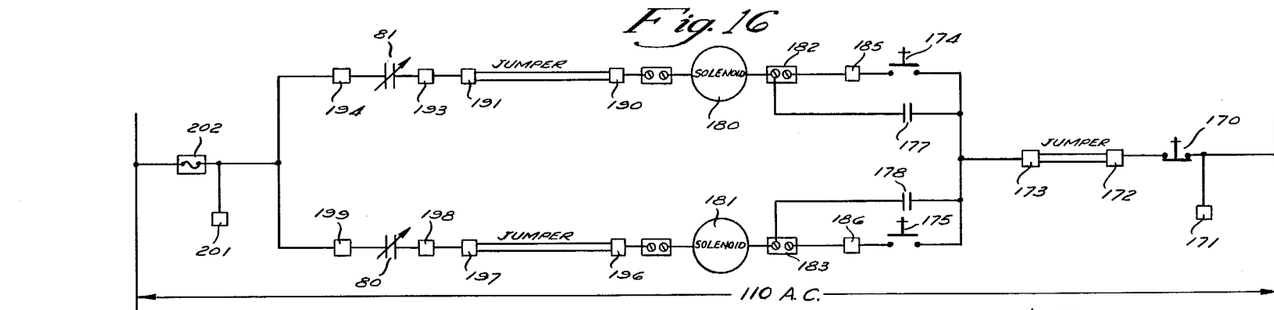
FIG. 16 is a wiring diagram of a basic master control circuit of this invention.

Referring to FIG. 16, the fundamental master control circuit of this invention illustrated therein is shown connected across a 110-volt A.C. line with a manual push button switch 170 located at the machine for de-energizing the circuit. Terminals are indicated at 171, 172, and 173, the latter two being jumpered in this diagram although it will be understood that this circuit may be used, as will be described in reference to FIG. 18, in an automatic controller system of this invention. Switches 174 and 175 are opening and closing switches, respectively, for operating greenhouse vents and these are also disposed at the machine. These opening and closing switches are of the push button type and the upper one represents the clockwise rotation of the motor while the lower one represents counterclockwise operation. Contacts paralleling these two switches are shown, respectively, at 177 and 178 being connected to the respective clockwise and counterclockwise solenoid coils 180 and 181 through terminals 182 and 183. Contacts 177 and 178 are closed by the operation of one or the other solenoid and permit the removal of the original stimulating circuit created by depressing one of the push buttons 174 or 175. Terminals 185 and 186, like terminals 171, 172, and 173 are provided for integrating this circuit into an automatic controller.

The circuit of FIG. 16 is completed as to solenoids 180 and 181 through two separate sets of terminals and a pair of micro-limit switches and through a common terminal and a fuse. Thus in respect to solenoid 180, terminals 190 and 191 are jumpered and micro-limit switch 81 for limiting the open position of the vents controlled by this circuit is connected into the circuit through terminals 193 and 194. Solenoid 181 is similarly connected through terminals 196 and 197 and a jumper therebetween and terminals 198 and 199 to micro-limit switch 80 limits the closed position of the vents. Terminal 201 serves both solenoids in their respective circuits as does fuse 202.

Figure 17:
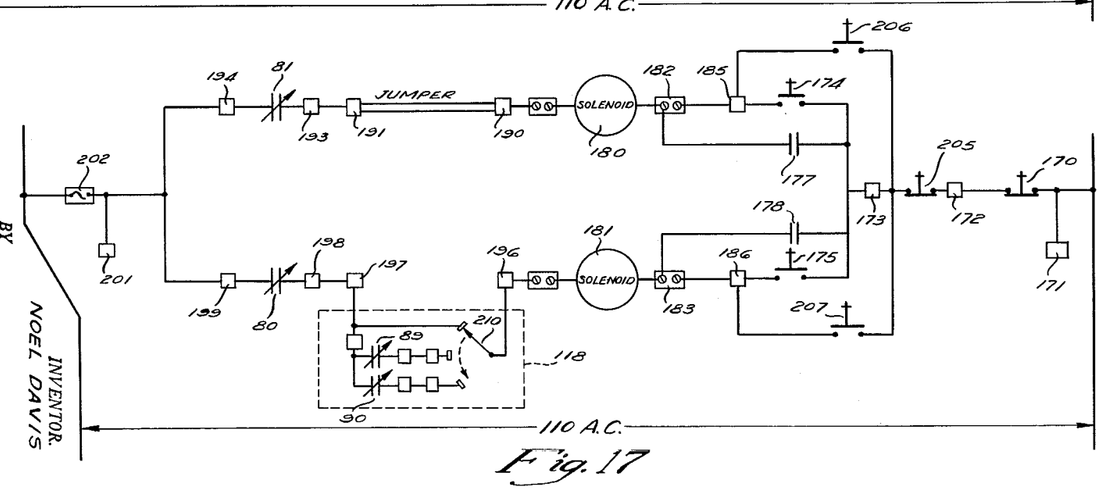
FIG. 17 is a wiring diagram of a master control circuit including a remote operating station and limit selector of this invention system.

The circuit of FIG. 17 is basically similar to that of FIG. 16, but includes additional elements or components and provides additional functional features. Thus this FIG. 17 circuit is a master control circuit with master remote station. The reference characters of FIG. 16 are used in FIG. 17 for the corresponding elements so that the description of the basic circuit set forth above applies to FIG. 17 and the description of the latter will therefore be limited to the additional elements.

In place of the jumper, between terminals 172 and 173, a remote push button stop 205 is provided, this being the "stop" button illustrated in FIG. 15. The "up" and "down" buttons of FIG. 15 represented in FIG. 17 by the reference characters 206 and 207, respectively, are connected to the solenoid coils through terminals 185 and 186, respectively, and to the line through push buttons 205 and 170, thus providing overriding stop protection from either operating position.

The limit selector unit of FIG. 15 is diagrammatically shown in the outline identified by the character 118. This selector includes three position switch 210 which enables manual closing control through the range from the tight upper position through the intermediate night position and the more open rain position. Micro-limit switches 89 and 90 serve the night and rain circuits, respectively, and the limit selector as a whole is connected to the main circuit through terminals 196 and 197, displacing the jumper shown at the corresponding location in FIG. 16.

The function of the circuits of FIGS. 16 and 17 may be better understood by reference to FIGS. 11 and 12. Thus solenoids 180 and 181 of these FIGS. 16 and 17 circuits cause a toggle switch similar to that of FIG. 12 to be operated with the result that the motor of the system providing the power to open or close the greenhouse vents is rotated in the proper direction as indicated by the particular solenoid to effect the desired adjustment in vent position.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. Ventilating apparatus for a greenhouse having at least two parallel gable roofs, a ridge for each roof and a gutter post between and below the ridges, said apparatus comprising first and second sets of windows constituting parts of said roofs and swingably mounted on pivots disposed adjacent to the ridges, the first set being mounted on the same side of both ridges and opening in one direction and the second being mounted on the other side of said ridges and opening in the opposite direction, and similar, separate means disposed wholly within the greenhouse for actuating the windows of each set simultaneously and independently of the windows of the other set, each of said similar means including driven shafts rotatably supported near the lower ends of their set of windows, rigid means attached to the lower parts of the windows of said set and movable endwise in opposite directions by said shafts for positively moving the windows of said set and for controlling the extent of movement of said set of windows, a drive shaft rotatably supported by one of said gutter posts and means connecting the drive shaft with the driven shafts for simultaneous rotation of the latter and positive endwise movement of said rigid means in the same direction by said driven shafts.

2. The combination of elements set forth in claim 1 in which a reversible motor is connected to said drive shaft to rotate the latter and switch means to start, stop and reverse said motor.

3. The combination of elements set forth in claim 1 in which the said rigid means include racks and the driven shafts have gears engaging said racks to move them endwise.

References Cited in the file of this patent

UNITED STATES PATENTS 919,673     Anderson _______________ Apr. 27, 1909

(Other references on following page)

UNITED STATES PATENTS

| | | |
|---|---|---|
| 1,515,376 | White | Nov. 11, 1924 |
| 1,653,336 | Blaski | Dec. 20, 1927 |
| 1,664,894 | Nesheim | Apr. 3, 1928 |
| 1,771,107 | Abt | July 22, 1930 |
| 1,796,232 | Barnes | Mar. 10, 1931 |
| 1,820,764 | Abt | Aug. 25, 1931 |
| 1,956,577 | Irwin | May 1, 1934 |
| 1,983,521 | Cooke | Dec. 11, 1934 |
| 2,001,180 | Buckner | May 14, 1935 |
| 2,227,114 | Tear | Dec. 31, 1940 |
| 2,276,740 | Saito | Mar. 17, 1942 |
| 2,566,824 | Carlson | Sept. 4, 1951 |
| 2,812,141 | Sueda et al. | Nov. 5, 1957 |

FOREIGN PATENTS

| | | |
|---|---|---|
| 498,316 | Germany | May 30, 1929 |
| 158,735 | Switzerland | Feb. 1, 1933 |